United States Patent
Fukui et al.

(10) Patent No.: US 7,697,890 B2
(45) Date of Patent: Apr. 13, 2010

(54) COMMUNICATION DEVICE AND COMMUNICATION SYSTEM

(75) Inventors: Kiyoshi Fukui, Mie (JP); Naoki Wakamiya, Osaka (JP); Tetsuya Kawai, Osaka (JP); Masayuki Murata, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 512 days.

(21) Appl. No.: 11/802,349

(22) Filed: May 22, 2007

(65) Prior Publication Data

US 2007/0274248 A1 Nov. 29, 2007

(30) Foreign Application Priority Data

May 22, 2006 (JP) .............................. 2006-141719

(51) Int. Cl.
*H04B 7/15* (2006.01)
(52) U.S. Cl. ..................... 455/11.1; 455/13.1; 455/41.1; 455/41.2; 370/335; 370/338
(58) Field of Classification Search ................ 455/11.1, 455/13.1, 41.1, 41.2
See application file for complete search history.

(56) References Cited

OTHER PUBLICATIONS

Naoki Wakamiya and Masayuki Murata, "Synchronization-Based Data Gathering Scheme for Sensor Networks," IEICE (Institute of Electronics, Information and Communication Engineers) Transactions on Communications, Mar. 2005, vol. E88-B, No. 3; pp. 873-881.

Shuntaro Kashihara, Naoki Wakamiya, and Masayuki Murata, "Design, Installation and Evaluation of Synchronous Sensor Information-Gathering Systems in Sensor Networks Installed in Buildings," IEICE Technical Report, 2006.

Tetsuya Kawai, Naoki Wakamiya, and Masayuki Murata, "A Fast and Reliable Transmission Mechanism of Urgent Information in Sensor Networks," IEICE Technical Report, SN 2006-05; pp. 23-29.

*Primary Examiner*—Matthew D Anderson
*Assistant Examiner*—Adel Youssef
(74) *Attorney, Agent, or Firm*—Rabin & Berdo, P.C.

(57) ABSTRACT

A wireless multi-hop network of a communication system is structured with a number of the communication devices and the collecting communication device. Transmission information from each communication devices is sequentially relayed to reach the collecting communication device. Each communication device features a function for on/off control of a transmission/reception processing section. The communication device also includes: a section which appends an urgent flag to urgent information that is to be relayed and transmits the urgent information, and fixes the transmission/reception processing section to 'on'; a section which verifies a relay by a relay destination communication device and, if verification is achieved, fixes the transmission/reception processing section to 'on' and switches to a state for promptly relaying received information; a section which, if the verification is not achieved, retransmits the urgent information; and a section which, when retransmitted urgent information is received, relay-transmits the information immediately.

9 Claims, 8 Drawing Sheets

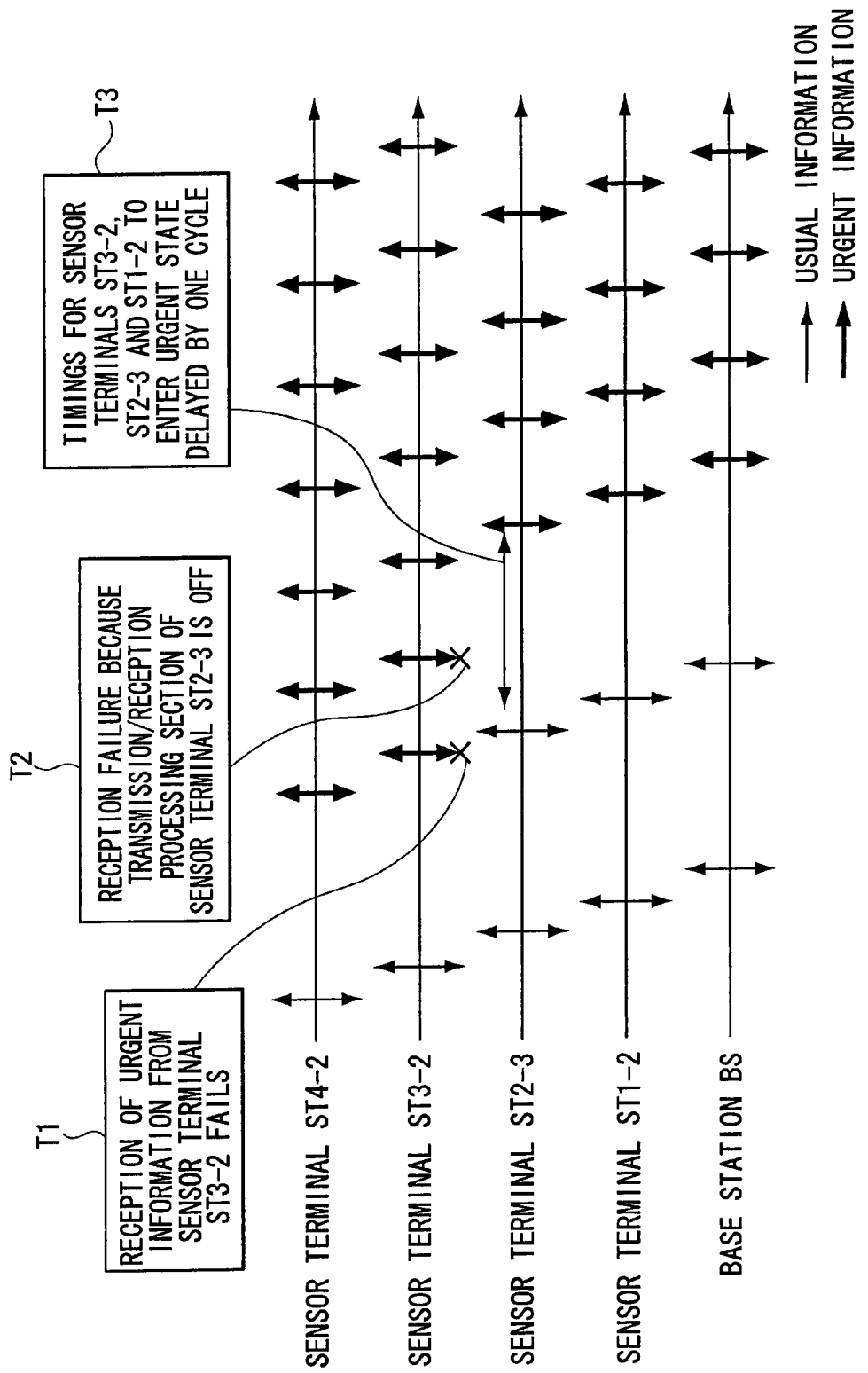

US 7,697,890 B2

COMMUNICATION DEVICE AND COMMUNICATION SYSTEM

CROSS-REFERENCE TO RELATED APPLICATION

This application claims priority under 35 USC 119 from Japanese Patent Application No. 2006-141719, the disclosure of which is incorporated by reference herein.

BACKGROUND OF THE INVENTION

1. Field of the Invention

The present invention relates to a communication device and a communication system. The present invention can be applied to, for example, a communication system capable of collecting data transmitted from a number of communication devices to a designated collecting communication device.

2. Description of the Related Art

In the IEICE (Institute of Electronics, Information and Communication Engineers) Transactions on Communications 2005 E88-B (3), pp. 873-881 (Document 1) and IEICE Technical Report IN 2006, "Design, Installation and Evaluation of Synchronous Sensor Information-Gathering Systems in Sensor Networks Installed in Buildings" (Document 2), a sensor network is described in which a wireless multi-hop network is constituted with a number of sensor terminals and a base station. Periodically, sensor information is collected from all the sensor terminals to the base station. In a sensor network described in Document 1 and Document 2, sensor information is sequentially transmitted from sensor terminals at peripheral portions of the sensor network in accordance with a collection interval, and sensor terminals closer to the base station relay the sensor information, appending their own sensor information thereto. Thus, the sensor information can be efficiently gathered by the base station with little delay. Moreover, in the sensor network described in Document 1 and Document 2, each sensor terminal transmits sensor information synchronously with a signal which a transmission destination sensor terminal will produce for transmitting sensor information, at a time slightly earlier than the time at which the transmission destination sensor terminal will transmit the sensor information thereof. Accordingly, a power supply of a transmission/reception processing section of each sensor terminal is turned on for receiving and transmitting sensor information only for a short period in the sensor information collection cycle, and the power supply of the transmission/reception processing section can be turned off at other periods. Therefore, the sensor information can be gathered with efficient use of electrical power.

FIG. 5 shows an example of a sensor network in which the conventional sensor information collection system described in Document 1 and Document 2 is applied. A number assigned to each sensor terminal is a number of hops required for transmission of sensor information from that sensor terminal to the base station. FIG. 6 shows transmission/reception timings of sensor terminals ST4-2, ST3-2, ST2-3 and ST1-2 over time, which are on a path shown by a heavy line in FIG. 5.

A base station BS transmits beacon information designating timings for collection of sensor information, at the interval of collection of sensor information.

A sensor terminal ST1 can receive the beacon information transmitted by the base station BS. At a time earlier by a pre-specified offset interval than a timing at which the sensor terminal ST1 will receive the beacon information transmitted by the base station BS, the sensor terminal ST1 puts together sensor information sent from (an)other sensor terminal(s) ST2 up until that time with sensor information acquired from a sensor of the sensor terminal ST1, and transmits all the sensor information. The information that is transmitted includes the number of hops (1 in this case) required to reach the base station BS.

A sensor terminal which cannot receive the beacon information from the base station BS (ST2 is considered as an example) receives sensor information transmitted from surrounding sensor terminals and selects from them the sensor terminal with the smallest number of hops required to reach the base station BS (i.e., ST1). Then, similarly to the above-described sensor terminal ST1 which can receive the beacon information from the base station BS, at a time earlier by the pre-specified offset interval than the timing at which that sensor terminal (ST1) will transmit, this sensor terminal (ST2) puts together sensor information sent from (an)other sensor terminal(s) (ST3) up until that time with sensor information acquired from a sensor of this sensor terminal (ST2), and transmits all the sensor information. The information that is transmitted includes the number of hops required to reach the base station BS.

Each sensor terminal operates as described above, and thus transfers of sensor information are implemented at the timings shown in FIG. 6, and the base station BS can periodically collect sensor information from all the sensor terminals.

Here, it is sufficient that each sensor terminal can receive both sensor information that is transmitted at a timing earlier by the offset interval than a transmission timing of this terminal and sensor information that is transferred by a transmission destination sensor terminal at a time later to the offset interval than the transmission timing of this terminal. Accordingly, control is performed such that the transmission/reception processing section thereof is turned on only for this period and the transmission/reception processing section is turned off in other periods. Therefore, operation with low power consumption is possible.

IEICE Technical Report SN 2006-05 pp. 23-29, "A Fast and Reliable Transmission Mechanism of Urgent Information in Sensor Networks" (Document 3) illustrates a system for, in the above-described sensor network, collecting sensor information which is more urgent then usual with high reliability and little delay. When urgent information arises at a sensor terminal, the sensor information is transmitted with an urgent flag, which indicates that the information is urgent, appended thereto. A sensor terminal that receives sensor information with the urgent flag appended switches into an urgent state. In the urgent state, control to turn the transmission/reception processing section on and off is stopped and the transmission/reception processing section is set into a continuously on state, such that urgent sensor information can be transferred at any time. In addition, in order to improve transfer reliability of urgent sensor information, transmissions of sensor information other than sensor information that includes urgent information are suppressed. By such operations, as described in FIG. 7, a region for transferring urgent information with small delays and high reliability can be formed between the sensor terminal at which the urgent information arose and the base station.

FIG. 7 shows states of sensor terminals and the like in the sensor network when urgent information has arisen as described above. In FIG. 7, sensor terminal ST4-2 is the terminal at which the urgent information arose. This sensor terminal ST4-2 and sensor terminals ST3-2, ST3-3, ST2-3 ST2-4 and ST1-2, which are on shortest paths from the sensor terminal ST4-2 to the base station BS, form a region for prioritizing and transferring urgent information.

However, the system for collecting urgent information described in Document 3 has the following problem.

If a sensor terminal fails to receive urgent information due to an effect of noise, an impact or the like, this sensor terminal cannot switch into the urgent state. Therefore, on/off control of the transmission/reception processing section thereof continues. Consequently, the transmission/reception processing section of this sensor terminal is set to the off state until the next time for collecting usual sensor information. In this period, the sensor terminal cannot switch into the urgent state. As a result, an amount of time required to establish the region which can transfer the urgent information with high reliability and little delay is lengthened.

FIG. 8 shows changes of state of the sensor terminals when there is a failure in reception of urgent information. As shown in FIG. 8, if sensor terminal ST3-2, which is to transfer the urgent information, fails to receive the urgent information (at T1), timings at which this sensor terminal ST3-2 and sensor terminals ST2-3 and ST1-2, to the base station side of the sensor terminal ST3-2, switch to the urgent state are delayed by an amount corresponding to one cycle of the sensor information collection interval (T3). Urgent information which arises in this period (at T2) cannot be transferred to the base station BS.

Accordingly, a communication device and communication system are desired which, even when a relay of urgent information between communication devices fails, can transmit urgent information as quickly as possible to a collecting communication device which is a final transmission destination.

SUMMARY OF THE INVENTION

A first aspect of the present invention is a communication device of a communication system in which a wireless multi-hop network is structured with a plurality of the communication device and a collecting communication device, transmission information from each of the communication devices being sequentially relayed by communication devices that are closer to the collecting communication device for the transmission information to reach the collecting communication device, the communication device wherein: a transmission and reception processing section that is controlled to turn on and off in accordance with transmission and reception timings for transfers of ordinary transmission information during transfers of ordinary transmission of information; an urgent information transmission section that appends a flag indicating urgency to information for which collection to the collecting communication device is urgently required and transmits the information, the information being information whose transmission source is the present communication device or the information to be relayed, and the urgent information transmission section, if a state of the present communication device at the time of appending and transmission is a usual state, setting the transmission and reception processing section to be continuously on and switching the present communication device to an urgency propagation verification state for verifying a relay of the information with the urgent flag appended by one of the communication devices which is a relay destination; an urgency propagation verification section that, in the urgency propagation verification state, verifies that the urgent flag is appended to information relayed by the relay destination communication device, to which the information with the urgent flag appended has been provided from the present communication device, for verifying the relay of urgent information by the relay destination and, when verification is achieved, sets the transmission and reception processing section to be continuously on and switches the present communication device to an urgent state for promptly relaying received information; an urgent information retransmission section that retransmits the urgent information if the urgency propagation verification section has not achieved verification of the relay of the urgent information by the relay destination; and a retransmitted urgent information transfer section that, when urgent information that has been retransmitted is received, immediately transmits this urgent information.

In the above aspect, the urgent information retransmission section may control a timing for retransmitting the urgent information to between a timing at which the relay destination communication device performs a relay and a timing at which a communication device which is a relay destination of the relay destination communication device performs a relay.

According to the aspect described above, when a relay from a communication device which is a relay destination of urgent information cannot be verified, the urgent information is retransmitted. Therefore, even when a relay of urgent information between communication devices fails, the urgent information can be transmitted as quickly as possible to a collecting communication device which is a final transmission destination.

BRIEF DESCRIPTION OF THE DRAWINGS

Preferred exemplary embodiments of the present invention will be described in detail based on the following figures, wherein:

FIG. 8 is an explanatory diagram of a problem with a conventionally urgent information transfer method in the sensor network of FIG. 5.

DETAILED DESCRIPTION OF THE INVENTION

(A) Embodiment

Herebelow, an embodiment in which a communication device and communication system according to the present invention are applied to a sensor network will be described in detail with reference to the drawings.

Figure 5:
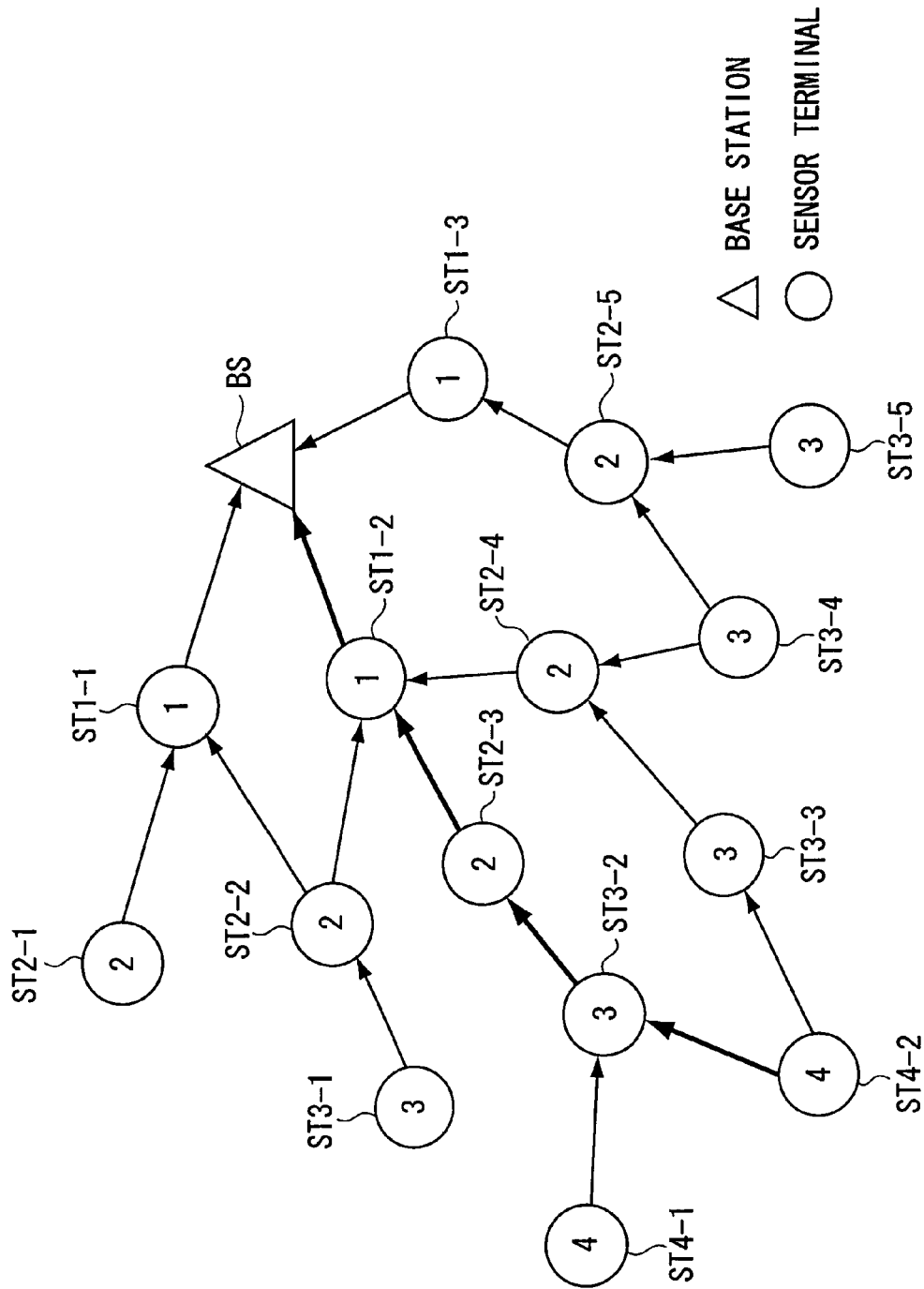
FIG. 5 is an explanatory diagram showing an example of an arrangement of nodes (sensor terminals and a base station) in an ordinary sensor network.
Figure 6:
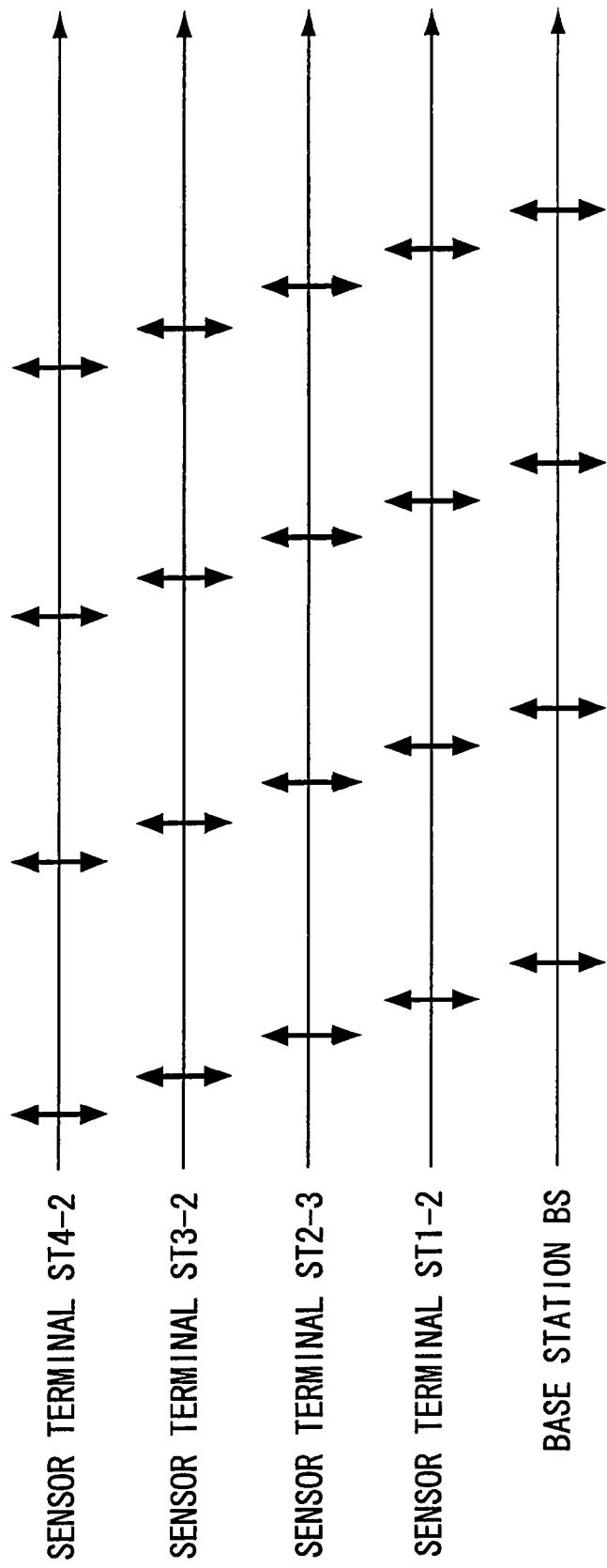
FIG. 6 is an explanatory diagram showing sensor information transfer timings at nodes of FIG. 5.

In a sensor network of this embodiment, similarly to FIG. 5 as described earlier, a wireless multi-hop network is structured with plural sensor terminals ST1 to ST4 and a single base station BS. As a basic sensor information collection system, the system described in Document 1 to 3 is applied. However, an urgent information collection system of the sensor network of this embodiment is an improvement from the system described in Document 3.

(A-1) Structure of the Embodiment

Figure 2:
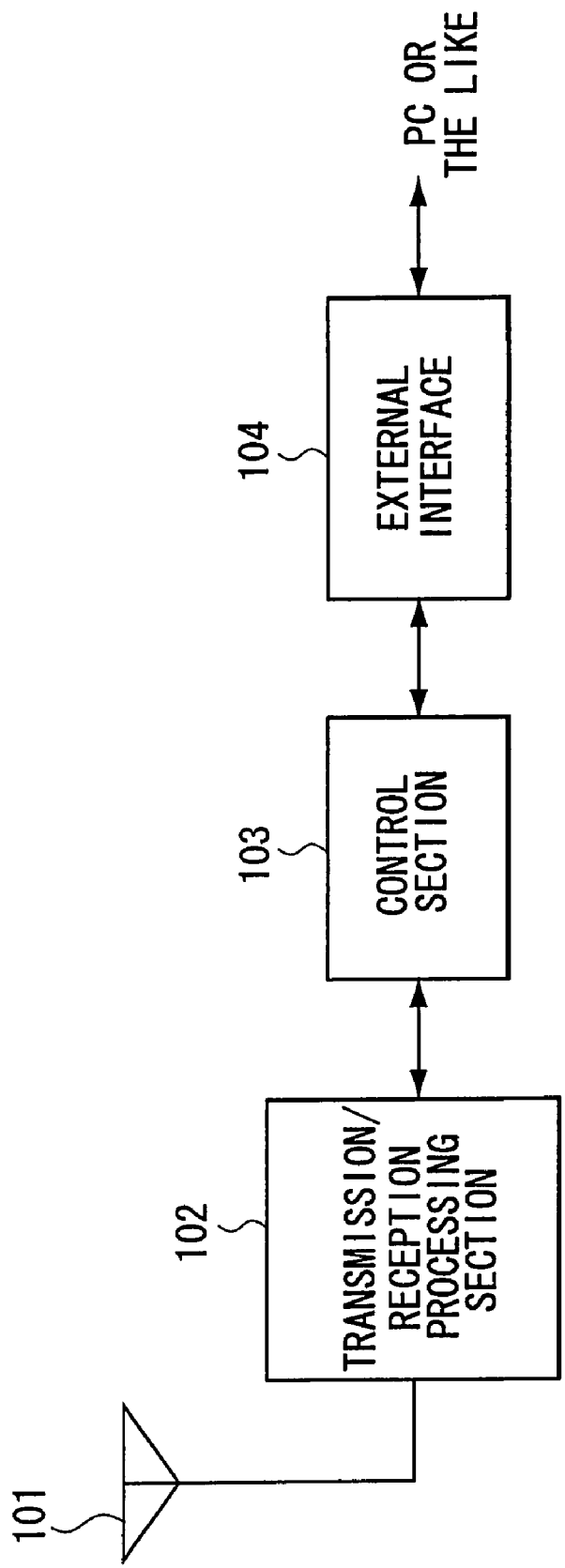
FIG. 2 is a block diagram showing detail structure of a base station in the sensor network of the embodiment.

FIG. 2 is a block diagram showing internal structure of a base station 100 of the embodiment, which is a sensor information collection terminal (see 'BS' in FIG. 5). In FIG. 2, the base station 100 includes an antenna 101, a transmission/reception processing section 102, a control section 103, an external interface 104 and the like.

The antenna 101 is an antenna for transmitting and receiving wireless signals and is, for example, a non-directional antenna.

The transmission/reception processing section 102 is responsible for a function of transmitting data specified by the control section 103 (for example, beacon information) through the antenna 101. The transmission/reception processing section 102 is also responsible for a function of converting wireless signals received through the antenna 101 to digital data and passing the digital data to the control section 103. For example, for reception, the transmission/reception processing section 102 administers functions for pre-amplification, filtering, digital demodulation and the like, and for transmission, the transmission/reception processing section 102 administers functions of digital modulation, filtering, power amplification and the like. For this embodiment, a system of digital modulation and suchlike are not relevant.

The control section 103 is responsible for a function of preparing transmission data, such as beacon information designating a timing for collection of sensor information and the like, a function of controlling a timing of transmission of the transmission data that is prepared, a function of processing received data, and a function of sending the received sensor information to an external processing device, such as a personal computer or the like, via the external interface 104. Herein, the control section 103 corresponds to, for example, a CPU and a program executed by the CPU.

The external interface 104 is responsible for a function of connecting the control section 103 with the external processing device, which is a PC or the like.

Figure 1:
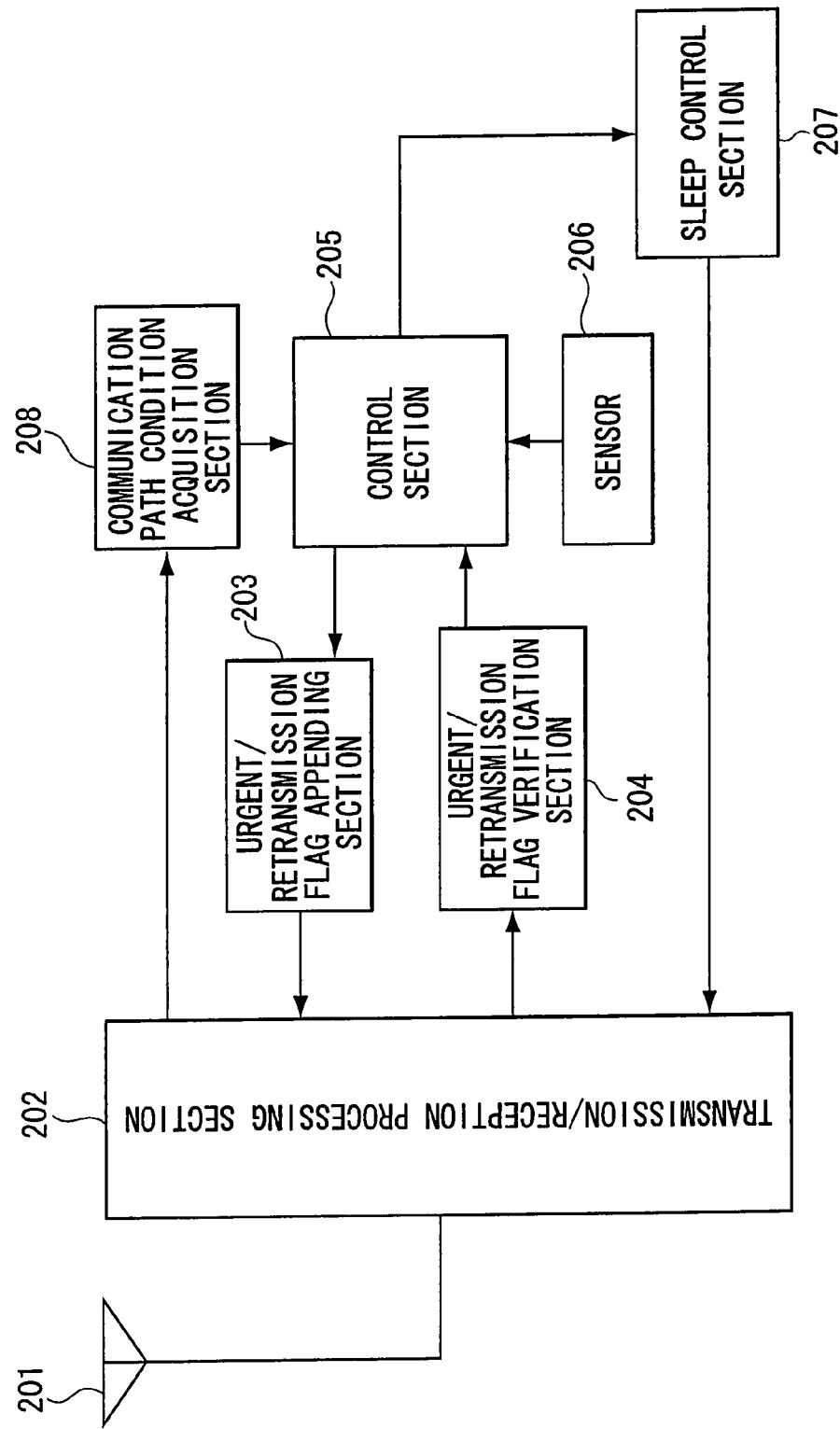
FIG. 1 is a block diagram showing detail structure of a sensor terminal in a sensor network of an embodiment.

FIG. 1 is a block diagram showing internal structure of each of sensor terminals 200 of the present embodiment (ST1 to ST4 in FIG. 5 and the like). The sensor terminal 200 is a source of transmission of sensor information, and relays received sensor information. In FIG. 1, the sensor terminal 200 includes an antenna 201, a transmission/reception processing section 202, an urgent/retransmission flag appending section 203, an urgent/retransmission flag verification section 204, a control section 205, a sensor 206, a sleep control section 207, a communication path condition acquisition section 208 and the like.

The antenna 201 is an antenna for transmitting and receiving wireless signals and is, for example, a non-directional antenna.

The transmission/reception processing section 202 is responsible for a function of transmitting data specified by the control section 205 through the antenna 201, a function of converting wireless signals received through the antenna 201 to digital data and passing the digital data to the control section 205 via the urgent/retransmission flag verification section 204, and a function of notifying the communication path condition acquisition section 208 with information for judging a communication path condition. Transmission processing and reception processing by the transmission/reception processing section 202 are in essence the same as for the transmission/reception processing section 102 of the base station 100.

In the case of this embodiment, the transmission/reception processing section 202 is controlled to turn on and off by the sleep control section 207. This on/off control is in accordance with the processes described in the earlier-mentioned Document 1 and Document 2.

The urgent/retransmission flag appending section 203 is responsible for a function of appending an urgent flag or a retransmission flag to sensor information to be transmitted, in accordance with instructions from the control section 205. When an urgent flag or retransmission flag is not to be appended, the urgent/retransmission flag appending section 203 passes on sensor information from the control section 205 unaltered and provides the sensor information to the transmission/reception processing section 202.

The urgent/retransmission flag verification section 204 is responsible for a function of verifying whether or not an urgent flag or retransmission flag has been appended to data received by the transmission/reception processing section 202. If an urgent flag or retransmission flag has been appended, the flag is removed, the sensor information is provided to the control section 205 and the urgent/retransmission flag verification section 204 notifies the control section 205 that the flag was appended. For sensor information to which an urgent flag or retransmission flag has not been appended, the urgent/retransmission flag verification section 204 provides the sensor information to the control section 205 without alteration.

The control section 205 is responsible for a function of acquiring sensor information from the sensor 206, a function of preparing transmission data from either just the sensor information acquired from the sensor 206 or the sensor information acquired from the sensor 206 and received data, a function of controlling a timing of transmission of the prepared transmission data, a function of retransmitting data which has already been transmitted, a function of determining a retransmission timing from a communication path condition notified from the communication path condition acquisition section 208, and a function of notifying the sleep control section 207 of a timing to turn the transmission/reception processing section 202 off and a timing to turn the transmission/reception processing section 202 on again. Herein, the control section 205 corresponds to, for example, a CPU and a program executed by the CPU.

The sensor 206 is responsible for functions of acquiring sensor information and providing the sensor information to the control section 205. For this embodiment, the type of sensor is not relevant.

The sleep control section 207 controls to turn the transmission/reception processing section 202 on and off in accordance with the timings notified from the control section 205.

The communication path condition acquisition section 208 judges the communication path condition from the information provided from the transmission/reception processing section 202, and notifies the control section 205 of the communication path condition. The above-mentioned information for judging a communication path condition may be, for example, a value of reception power during information reception, and may be, for example, an error rate in information reception (a bit error rate, a frame error rate or the like), and may be, for example, any other kind of information as long as the communication path condition can be estimated from such information.

(A-2) Operation of the Embodiment

Next, operation of the sensor network of the embodiment, which is constituted with the base station 100 and the plural sensor terminals 200 having the structures described above, will be described.

In the sensor network of this embodiment, when urgent information has not arisen, operations for the base station to collect sensor information from all the sensor terminals are similar to conventional operations (see Document 1 and Document 2). Further, when urgent information has arisen, operations of all sensor terminals that are disposed on a path from a sensor terminal at which the urgent information has arisen to the base station, when these sensor terminals have entered an urgent state, are similar to the operations described in Document 3.

Accordingly, operations when urgent information arises, to put all the sensor terminals disposed on the path from the sensor terminal at which the urgent information arises to the base station into the urgent state, will be described below. In this embodiment, such that urgent information can be prioritized and transferred, a state of each sensor terminal 200 is defined as a usual state, an urgent state, or an urgency propagation verification state. At each sensor terminal 200, the state thereof is managed and controlled by the control section 205.

The usual state is a state in which urgent information is not included in the sensor information transmitted or received by the sensor terminal 200, and is the state assumed by those sensor terminals 200 that have no effect on a transfer of urgent information.

The urgent state is a state in which, such that urgent information can be transferred at any time, control to turn the transmission/reception processing section 202 on and off is stopped, the transmission/reception processing section 202 is kept on continuously, and transmissions of sensor information other than sensor information that includes urgent information (that is, of sensor information not containing urgent information) are suppressed. When it is understood that there is no more need to transfer urgent information, the sensor terminal 200 may resume on/off control of the transmission/reception processing section 202.

The urgency propagation verification state is a state in which processing is carried out to enable the sensor terminals 200 at the transfer destination side, which are required for transferring the urgent information, to switch into the urgent state reliably. A sensor terminal in the urgency propagation verification state also stops on/off control of the transmission/reception processing section 202 and keeps the transmission/reception processing section 202 on continuously.

Figure 7:
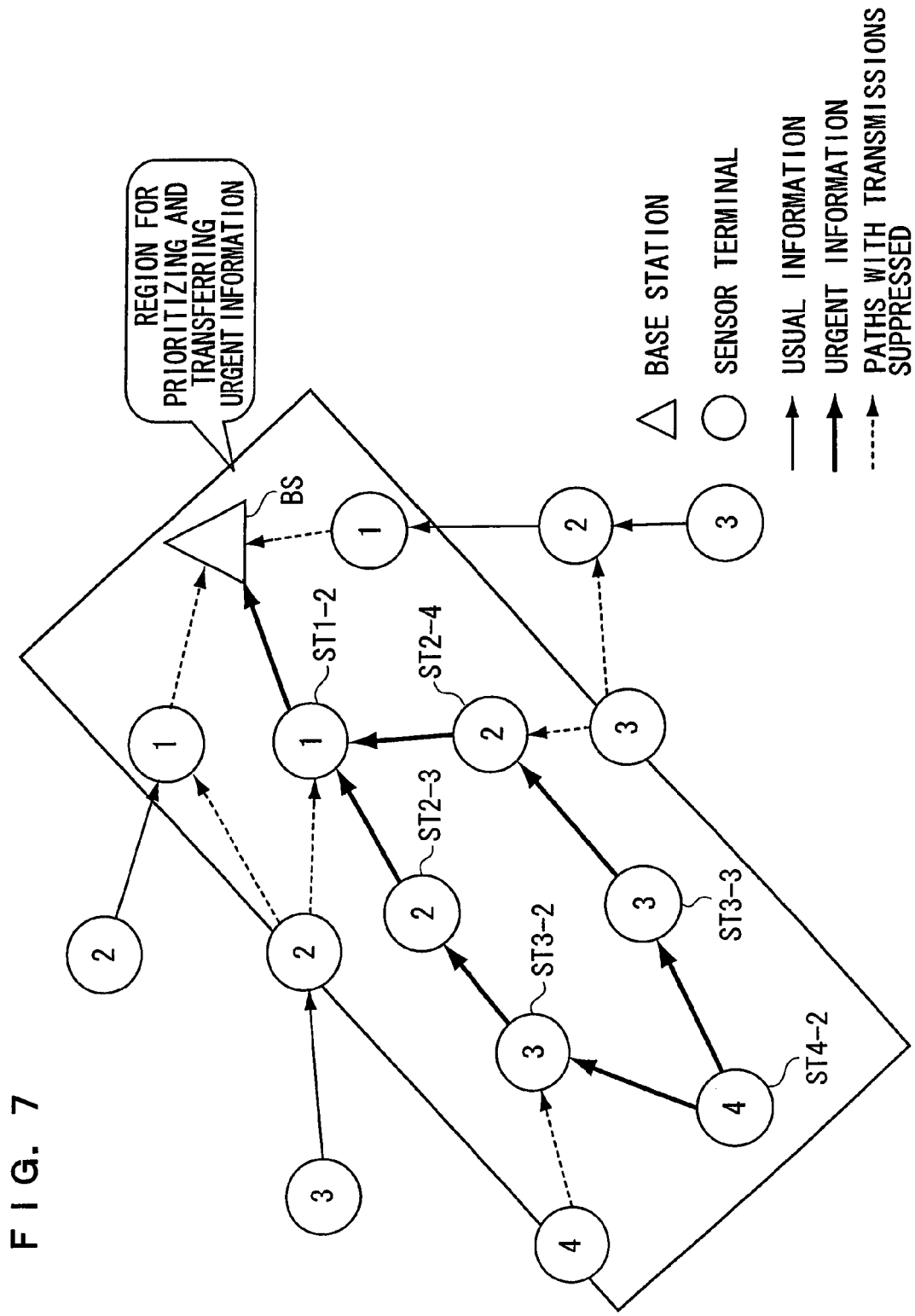
FIG. 7 is an explanatory diagram of sensor information paths in relation to urgent information in the sensor network of FIG. 5.

As shown in FIG. 7, when urgent information arises at one of the sensor terminals 200 (in this paragraph, the terminal ST4-2 in FIG. 7), a region is to be established in the same manner as previously, being constituted by the urgent state sensor terminals ST3-2, ST3-3, ST2-3, ST2-4 and ST1-2 between the sensor terminal ST4-2 at which the urgent information has arisen and the base station 100 (BS). In this embodiment, the urgency propagation verification state is introduced in order to avoid situations in which a delay in the establishment of the region is caused by a failure in propagation of the urgent information, and to implement processing for establishing the region with little delay.

Figure 3:
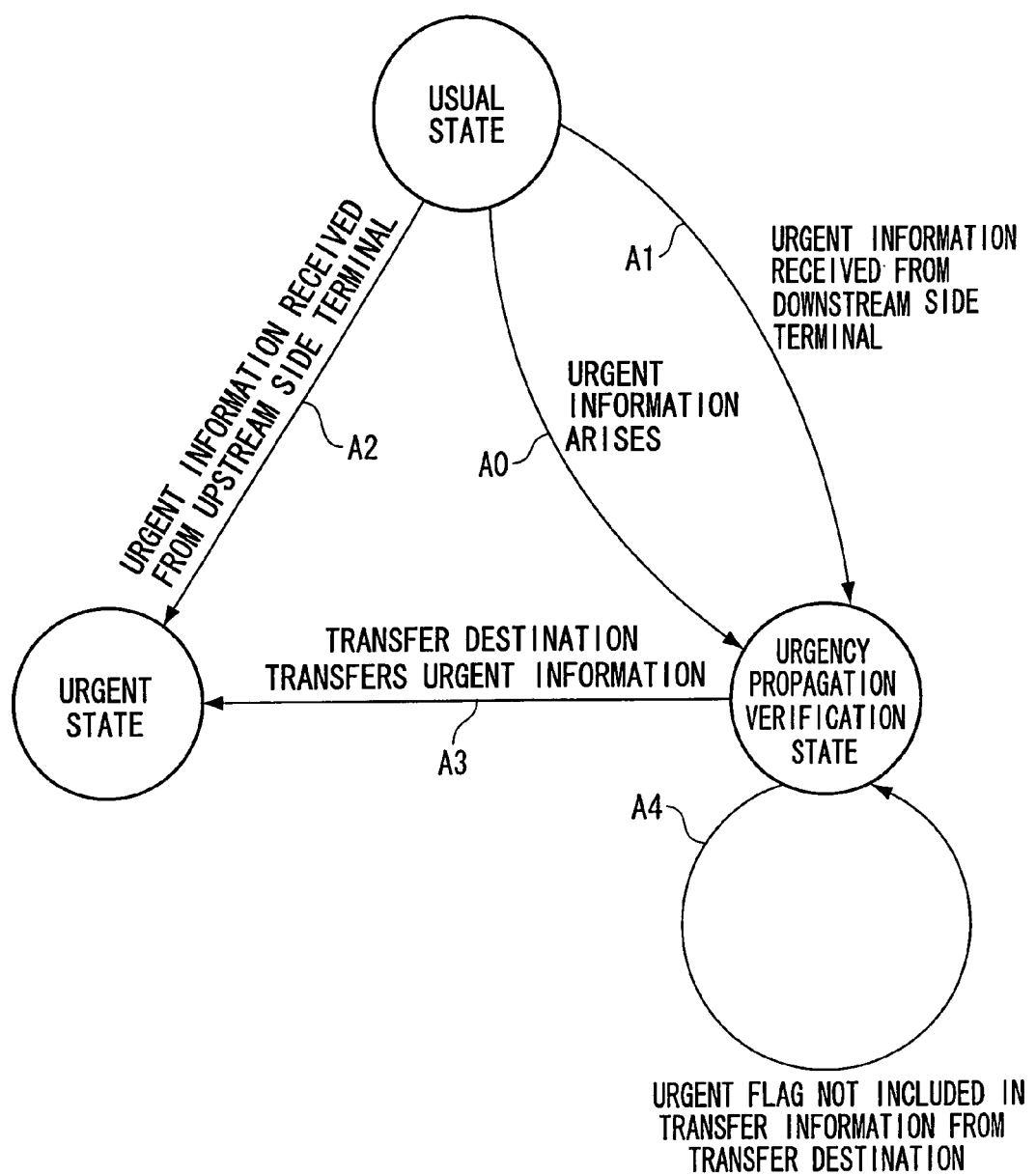
FIG. 3 is a state change diagram of one of the sensor terminals of the embodiment.

Each sensor terminal 200 operates as follows for the transfer of urgent information in order to alter the state thereof to the urgent state. FIG. 3 is a state change diagram concerning switching of each sensor terminal 200 from the usual state to the urgent state.

When urgent information arises at one of the sensor terminals (see terminal ST4-2 in FIG. 7), the sensor information transmitted from the present terminal is transmitted with an urgent flag, which indicates that there is urgent information in the transmitted sensor information, appended thereto. At this sensor terminal 200, the control section 205 provides the sensor information (i.e., the urgent information) to the urgent/retransmission flag appending section 203 and instructs appending of the urgent flag, and the sensor information with the urgent flag appended is transmitted. The state of the sensor terminal at which the urgent information has arisen (sensor ST4-2 in FIG. 7) is set to the urgency propagation verification state (arc A0 in FIG. 3), for example, when the sensor information with the urgent flag appended has been transmitted. The sensor terminal in the urgency propagation verification state performs operations which are executed as described below.

If a sensor terminal 200 in the usual state receives sensor information with the urgent flag appended from a sensor terminal for which the number of hops required to the base station 100 (BS) is less than for the present terminal (i.e., a terminal to the upstream side, if the base station is considered as being furthest upstream), the present sensor terminal 200 switches into the urgent state (arc A2 in FIG. 3). Basically, the sensor terminals transfer towards upstream side sensor terminals, but in the sensor network of this embodiment, because wireless communications are performed, sensor information transferred by an upstream side terminal might be received at a downstream side sensor terminal. At this usual state sensor terminal 200, the control section 205 is provided by the urgent/retransmission flag verification section 204 with a notification that the urgent flag has been appended and with the sensor information, and the control section 205 accordingly switches a management state thereof from the usual state to the urgent state. For example, if sensor terminal ST2-3 in FIG. 7 is in the usual state, with sensor information including the urgent flag having not yet arrived from sensor terminal ST3-2, and sensor terminal ST2-3 receives sensor information with the urgent flag appended that has been transmitted by sensor terminal ST1-2, which has a smaller number of required hops, sensor terminal ST2-3 then switches from the usual state to the urgent state. At this time, because the sensor information was received from an upstream side sensor terminal, a transfer operation is not executed.

When a sensor terminal 200 in the usual state receives sensor information with the urgent flag appended from a sensor terminal for which the number of hops required to the base station 100 (BS) is the same as for the usual state terminal or greater than for the present terminal, the present sensor terminal 200 switches into the urgency propagation verification state (arc A1 in FIG. 3). The present terminal identifies an 'on' period of the transmission/reception processing section of a sensor terminal that will be a transfer destination, and transfers the urgent information thereto at a transmission timing of the usual state. For example, this corresponds to the sensor terminal ST2-3 of FIG. 7 in the usual state, for which the number of hops is 2, receiving sensor information with the urgent flag appended from the sensor terminal ST3-2, for which the number of hops is 3.

The sensor terminal 200 which has transferred the urgent information at the usual state transmission timing as described above then, after an offset period, receives sensor information which is transmitted by the transfer destination sensor terminal (i.e., a sensor terminal for which the required number of hops is fewer by 1), and verifies whether or not the urgent flag is included in the sensor information. Here, a case in which the transfer destination sensor terminal transmits sensor information including urgent information and the sensor information is not transmitted at an expected timing, is handled in a similar manner to a case in which the transfer destination sensor terminal could receive transferred sensor information but the urgent flag was not included. If, for example, the sensor terminal which transferred the sensor information including the urgent information was sensor terminal ST2-3 of FIG. 7, the sensor terminal ST2-3 verifies whether or not the transfer destination sensor terminal ST1-2 has received the transferred sensor information and the urgent flag was included. For this verification, the control section 205 performs verification from transmission source information in the sensor information, which is provided from the urgent/retransmission flag verification section 204, and the presence or absence of the urgent flag.

When the urgent flag is included in sensor information transferred by the sensor terminal that was the transfer destination of the sensor information including the urgent flag from the present terminal, the transfer source sensor terminal switches the management state thereof from the urgency propagation verification state to the urgent state (arc A3 in FIG. 3). For example, in FIG. 7, when the sensor terminal ST2-3 that transferred the urgent information verifies that the urgent flag is included in sensor information transferred by the transfer destination sensor terminal ST1-2, the sensor terminal ST2-3 switches the management state thereof from the urgency propagation verification state to the urgent state. At the sensor terminals 200 for which the transfer destination of urgent information is the base station 100, when the base station receives sensor information including urgent information, the base station, for example, returns a reception acknowledgement, and when the sensor terminal 200 receives this reception acknowledgement, the sensor terminal 200 switches the management state thereof from the urgency propagation verification state to the urgent state. As a further example, the sensor terminals 200 for which the urgent information transfer destination is the base station 100 may be not equipped with the urgency propagation verification state.

On the other hand, the urgent flag may not be included in sensor information transferred by the sensor terminal that was the transfer destination of the sensor information including the urgent information from the present sensor terminal 200. The sensor terminal 200 receives the sensor information from the transfer destination sensor terminal and then, within the offset period, the present terminal retransmits the sensor information including the urgent information that was previously transmitted, with a retransmission flag indicating that this is a retransmission appended thereto. In such a case, the urgency propagation verification state continues (arc A4 in FIG. 3). At the control section 205, when, in accordance with a verification result from the urgent/retransmission flag verification section 204, the control section 205 verifies that the urgent flag is not included in sensor information transferred by the transfer destination sensor terminal, the control section 205 provides the sensor information to be retransmitted to the urgent/retransmission flag appending section 203 and instructs the urgent/retransmission flag appending section 203 to append the retransmission flag thereto.

At this time, in consideration of the reception failure at the transfer destination, a timing for retransmitting the sensor information relating to the urgent information may be determined in accordance with the communication path condition judged by the communication path condition acquisition section 208, as well as the 'on' period of the transmission/reception processing section of the transfer destination sensor terminal. This timing might be a pre-specified timing regardless of the communication path condition, and this transmission timing may be randomly assigned in a pre-specified time range. Alternatively, the timing may be altered in accordance with the communication path condition. For example, if the communication path condition is poor, earlier retransmission is possible. In such a case, there is an advantage in that, if the retransmission fails, periods which can be utilized for further retransmissions are available in greater numbers. Herein, it is preferable to control such that the timing for retransmitting the sensor information relating to the urgent information is between a timing at which the relay destination sensor terminal performs a relay and a timing at which a sensor terminal that is a relay destination of the relay destination sensor terminal will perform a relay.

Moreover, when retransmitting the sensor information relating to the urgent information, communication power may be made larger than for usual transmissions.

When a usual state sensor terminal 200 receives sensor information with the retransmission flag appended, regardless of a usual transmission timing of the present terminal, the present sensor terminal 200 immediately removes the retransmission flag from the received sensor information and transfers the sensor information (with the urgent flag appended). In such a case too, because sensor information relating to urgent information has been received, the sensor terminal 200 switches into the urgency propagation verification state (arc A1 in FIG. 3). Here, the control section 205 is provided with the sensor information for which appending of the retransmission flag and urgent flag has been verified by the urgent/retransmission flag verification section 204, promptly provides this sensor information to the urgent/retransmission flag appending section 203, and instructs the urgent/retransmission flag appending section 203 to append the urgent flag.

When the sensor terminal that has retransmitted the sensor information relating to the urgent information verifies that the urgent flag is included in sensor information transferred by the transfer destination sensor terminal, the present sensor terminal switches into the urgent state (arc A3 in FIG. 3).

However, if, after a retransmission, the sensor information has not been transferred from the transfer destination sensor terminal even after a wait of a certain period, (i.e., if the transfer from the transfer destination cannot be verified), the sensor information including the urgent information may be retransmitted again (i.e., re-retransmitted).

An operation for returning all the sensor terminals in the urgent state to the usual state when transfers of urgent information are no longer necessary may be, for example, to transmit sensor information that does not include the urgent flag from the sensor terminal that was the transmission source of the urgent information. When the other sensor terminals receive the sensor information not including the urgent flag, the sensor terminals return from the urgent state to the usual state.

Figure 4:
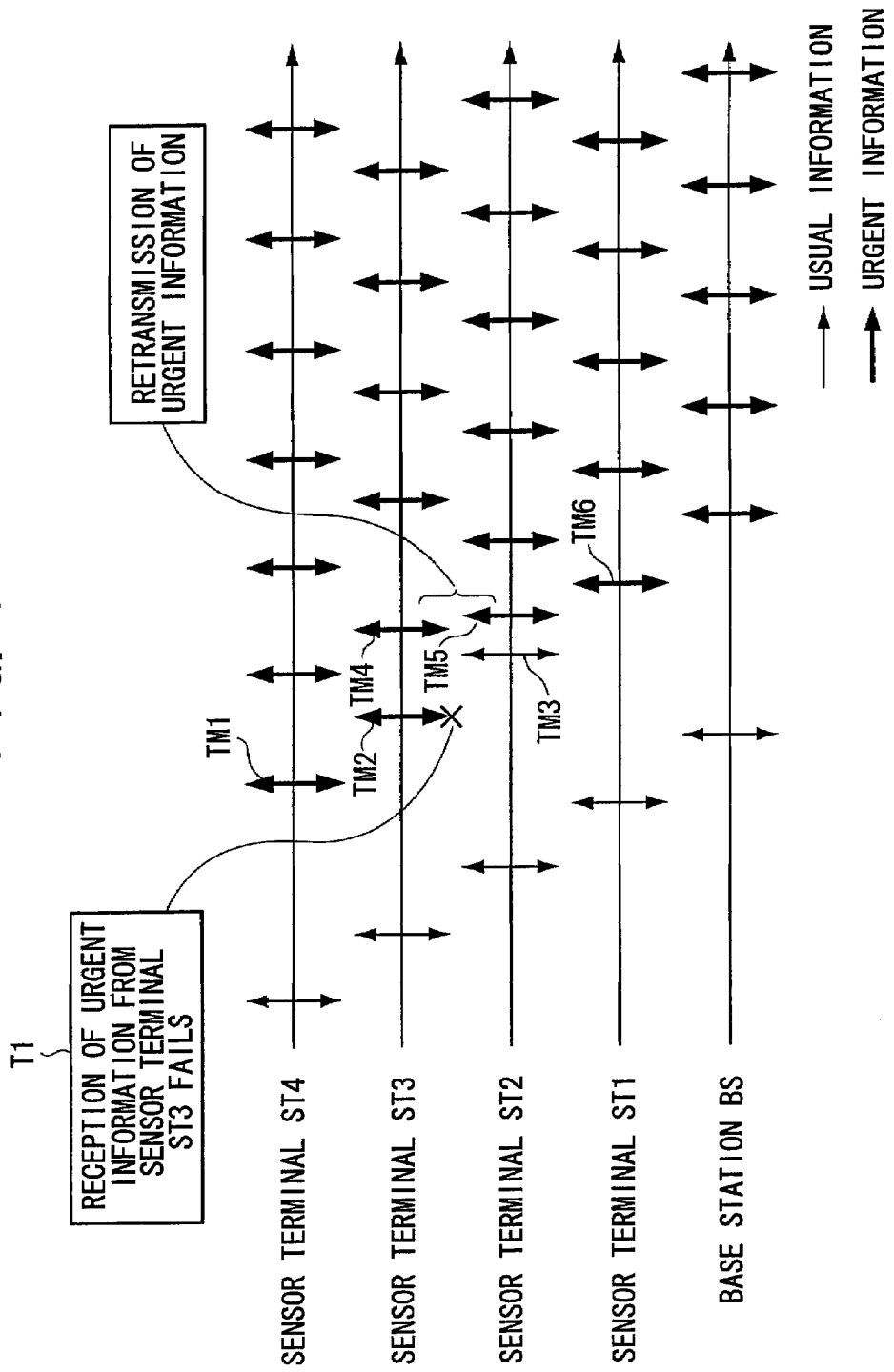
FIG. 4 is an explanatory diagram showing sensor information transfer timings in relation to urgent information in the embodiment.

FIG. 4 is an explanatory diagram showing transfer timings of sensor information in relation to urgent information, illustrating a case in which there is a transfer failure for an initial transfer of urgent information.

At a sensor terminal ST4, when urgent information arises in the usual state, the sensor terminal ST4 transmits sensor information relating to the urgent information at a timing TM1, with consideration to the 'on' period of the transmission/reception processing section 202 of a sensor terminal ST3 which is one hop upstream. At this time, the sensor terminal ST4 switches from the usual state into the urgency propagation verification state.

When the sensor terminal ST3 receives this sensor information, the sensor terminal ST3 transmits the sensor information relating to the urgent information at a timing TM2 with consideration to the 'on' period of the transmission/reception processing section 202 of a sensor terminal ST2, which is one hop upstream, and the sensor terminal ST3 switches from the usual state to the urgency propagation verification state. At this time, the downstream sensor terminal ST4 can verify the transfer of the sensor information (i.e., urgent information) from the sensor terminal ST3 that was the transfer destination of the sensor terminal ST4, so the sensor terminal ST4 switches from the urgency propagation verification state to the urgent state.

In this case, the sensor terminal ST2 fails to receive the sensor information (urgent information) transmitted by the downstream sensor terminal ST3 at the timing TM2. The sensor terminal ST2 transmits sensor information relating to usual information, which includes information obtained from the sensor 206 of the sensor terminal ST2, at a timing TM3 with consideration to the 'on' period of the transmission/reception processing section 202 of a sensor terminal ST1, which is one hop upstream therefrom. This sensor information (i.e., usual information) reaches the downstream side sensor terminal ST3 as well as the upstream side sensor terminal ST1.

Because the sensor information (usual information) from the sensor terminal ST2 to which the sensor information (urgent information) was to be transferred does not include the urgent flag, the sensor terminal ST3 retransmits the sensor information (urgent information) to the sensor terminal ST2 at a timing TM4, before the transmission/reception processing section 202 of the sensor terminal ST2 is to be turned off. At this time, the sensor terminal ST3 continues in the urgency propagation verification state.

The sensor terminal ST2 receives the sensor information (urgent information) which has been retransmitted, and promptly (at time TM5) transmits the received sensor information (urgent information) to the sensor terminal ST1 one hop upstream therefrom. The downstream sensor terminal ST3 verifies this transmission, and switches from the urgency propagation verification state to the urgent state. The sensor terminal ST2 which has received the retransmitted sensor information (urgent information), switches from the usual state to the urgency propagation verification state.

When the sensor terminal ST1 receives this sensor information (urgent information), the sensor terminal ST1 transmits the sensor information (urgent information) to the base station BS at a transmission timing TM6 of the sensor terminal ST1, and the state of the sensor terminal ST1 switches from the usual state to the urgency propagation verification state (or the urgent state). The downstream sensor terminal ST2 verifies this transmission, and switches from the urgency propagation verification state to the urgent state. The sensor terminal ST1 switches from the urgency propagation verification state to the urgent state upon receiving a reception acknowledgement (ACK) from the base station BS.

By the sequence of operations described above, the sensor terminals ST4 to ST1 enter the urgent state. That is, the sensor terminals enter a state in which on/off control of the transmission/reception processing sections 202 is not performed but the terminals are continuously on, and it is possible to promptly transfer urgent information from downstream at arbitrary times.

(A-3) Effects of the Embodiment

According to the embodiment described above, the urgency propagation verification state is newly added to the process of switching to the urgent state for transferring and collecting urgent information. The urgency propagation verification state verifies propagation of urgent information to the upstream side and is switched to the urgent state. Thus, even when propagation of urgent information between terminals fails, a delay duration from the urgent information being generated until that information is first collected to the base station can be made shorter than with previous technologies.

(B) Other Embodiments

In the embodiment described above, a case in which the transmission/reception processing section 202 is the only object of on/off control by the sleep control section 207 has been illustrated. However, the sleep control section 207 may perform on/off control of other structural elements (the urgent/retransmission flag appending section 203, the urgent/retransmission flag verification section 204, the control section 205 and/or the sensor 206).

Moreover, a case in which the present invention is applied to a sensor network such as that illustrated in Document 3 has been illustrated. However, a system for application of the present invention is not limited thus. Any system employing a mode and/or processes different from the above-described embodiment is possible as long as the following conditions are met: that it is a system which collects information from a certain communication device to a base station (collecting communication device) with the information being relayed by other communication devices; that a transmission/reception processing section of a communication device which contributes to relaying is controlled to turn on and off; and that the system deals with urgent information. Furthermore, the system may have plural base stations. For example, in the embodiment described above, a case has been illustrated in which a communication device which contributes to relaying (i.e., a sensor terminal) itself appends information. However, a communication device which performs a relay operation may be a device which just performs the relay operation.

What is claimed is:

1. A communication device of a communication system in which a wireless multi-hop network is structured with a plurality of the communication device and a collecting communication device, transmission information from each of the communication devices being sequentially relayed by communication devices that are closer to the collecting communication device for the transmission information to reach the collecting communication device, the communication device comprising:

a transmission and reception processing section that is controlled to turn on and off in accordance with transmission and reception timings for transfers of ordinary transmission information during transfers of ordinary transmission of information;

an urgent information transmission section that appends a flag indicating urgency to information for which collection to the collecting communication device is urgently required and transmits the information, the information being information whose transmission source is the present communication device or the information to be relayed, and the urgent information transmission section, if a state of the present communication device at the time of appending and transmission is a usual state, setting the transmission and reception processing section to be continuously on and switching the present communication device to an urgency propagation verification state for verifying a relay of the information with the urgent flag appended by one of the communication devices which is a relay destination;

an urgency propagation verification section that, in the urgency propagation verification state, verifies that the urgent flag is appended to information relayed by the relay destination communication device, to which the information with the urgent flag appended has been provided from the present communication device, for verifying the relay of urgent information by the relay destination and, when verification is achieved, sets the transmission and reception processing section to be continuously on and switches the present communication device to an urgent state for promptly relaying received information;

an urgent information retransmission section that retransmits the urgent information if the urgency propagation verification section has not achieved verification of the relay of the urgent information by the relay destination; and a retransmitted urgent information transfer section that, when urgent information that has been retransmitted is received, immediately transmits this urgent information.

2. The communication device of claim 1, wherein the urgent information retransmission section controls a timing for retransmitting the urgent information to between a timing at which the relay destination communication device performs a relay and a timing at which a communication device which is a relay destination of the relay destination communication device performs a relay.

3. The communication device of claim 1, further comprising a communication path condition acquisition section that acquires a condition of a communication path, the urgent information retransmission section determining a timing for retransmitting in accordance with the communication path condition.

4. The communication device of claim 2, further comprising a communication path condition acquisition section that acquires a condition of a communication path, the urgent information retransmission section determining the timing for retransmitting in accordance with the communication path condition.

5. The communication device of claim 3 wherein, if the communication path condition is poor, the urgent information retransmission section sets the timing for retransmitting to be earlier than if the communication path condition is good.

6. The communication device of claim 4 wherein, if the communication path condition is poor, the urgent information retransmission section sets the timing for retransmitting to be earlier than if the communication path condition is good.

7. The communication device of claim 1, wherein the urgent information retransmission section appends a retransmission flag, which indicates retransmission, to urgent information that is to be retransmitted.

8. The communication device of claim 1 wherein, if verification of a relay by the relay destination of urgent information which has been retransmitted is not achieved, the urgent information retransmission section retransmits the urgent information again.

9. A communication system in which a wireless multi-hop network is structured with a plurality of communication devices and a collecting communication device, transmission information from each of the communication devices being sequentially relayed by communication devices that are closer to the collecting communication device for causing the transmission information to reach the collecting communication device, wherein the communication system employs the communication device of claim 1 as each of the communication devices.

* * * * *

UNITED STATES PATENT AND TRADEMARK OFFICE
CERTIFICATE OF CORRECTION

PATENT NO. : 7,697,890 B2
APPLICATION NO. : 11/802349
DATED : April 13, 2010
INVENTOR(S) : Kiyoshi Fukui et al.

It is certified that error appears in the above-identified patent and that said Letters Patent is hereby corrected as shown below:

Title Page, Item 73 (Assignee)

Please change the listing of Assignees to read as follows:

--Oki Electric Industry Co., Ltd., Tokyo (JP)
Osaka University, Osaka (JP)--

Signed and Sealed this
Twenty-fifth Day of September, 2012

David J. Kappos
*Director of the United States Patent and Trademark Office*